(12) United States Patent
Miles et al.

(10) Patent No.: US 7,467,767 B2
(45) Date of Patent: Dec. 23, 2008

(54) LIGHTWEIGHT CLAMP BLOCKS

(75) Inventors: Andrew Mark James Miles, Bristol (GB); Arthur Peter Frost, Bristol (GB); Adrian Brewster, Gloucester (GB); Jay Shapiro, Valencia, CA (US)

(73) Assignees: Rolls Royce PLC, London (GB); Kirkhill-Ta Co., Valencia, CA (US)

( * ) Notice: Subject to any disclaimer, the term of this patent is extended or adjusted under 35 U.S.C. 154(b) by 0 days.

(21) Appl. No.: 11/199,182

(22) Filed: Aug. 9, 2005

(65) Prior Publication Data
US 2006/0035507 A1    Feb. 16, 2006

Related U.S. Application Data

(60) Provisional application No. 60/601,126, filed on Aug. 13, 2004.

(51) Int. Cl.
*F16L 3/12*  (2006.01)

(52) U.S. Cl. .............. 248/74.1; 248/74.4; 248/62; 248/316.1; 174/42; 24/21; 24/20 R; 403/24; 403/235

(58) Field of Classification Search .......... 248/74.1, 248/74.4, 62, 316.1, 67.7, 67.5, 74.2, 74.5, 248/49, 230.5; 174/42, 93, 77, 75 C, 84 C, 174/78; 24/21, 20 R, 20 EE, 23 R, 270, 282, 24/284, 285; 403/24, 235, 375
See application file for complete search history.

(56) References Cited

U.S. PATENT DOCUMENTS

| | | | | |
|---|---|---|---|---|
| 2,942,127 | A | * | 6/1960 | Harse .................. 335/212 |
| 3,805,340 | A | * | 4/1974 | Bush et al. ............. 24/543 |
| 4,061,299 | A | * | 12/1977 | Kurosaki ............... 248/73 |
| 4,526,756 | A | * | 7/1985 | Wong .................. 422/104 |
| 4,687,234 | A | * | 8/1987 | Weinhold ............. 285/244 |
| 4,799,444 | A | * | 1/1989 | Lisowski ............. 114/221 R |
| H1012 | H | * | 1/1992 | Senatro ................ 248/68.1 |
| 6,098,251 | A | * | 8/2000 | Zielinski .............. 24/20 R |
| 7,097,141 | B2 | * | 8/2006 | Heath .................... 248/62 |

FOREIGN PATENT DOCUMENTS

| | | |
|---|---|---|
| GB | 321769 | 11/1929 |
| GB | 2 280 992 A | 2/1995 |

* cited by examiner

*Primary Examiner*—Kimberly T Wood
(74) *Attorney, Agent, or Firm*—Oliff & Berridge, PLC

(57) ABSTRACT

A clamp for securing an element to a structure comprises, a first part and a second part, engageable into a assembled state about the element to be secured. A flexible element is attached to the first part and the second part, which flexible element allows independent movement of the first part and second part when the clamp is not assembled. The clamp further comprises a tensioning mechanism adapted to hold the flexible element taught when the clamp is in the assembled state.

3 Claims, 3 Drawing Sheets

LIGHTWEIGHT CLAMP BLOCKS

Figure 1:
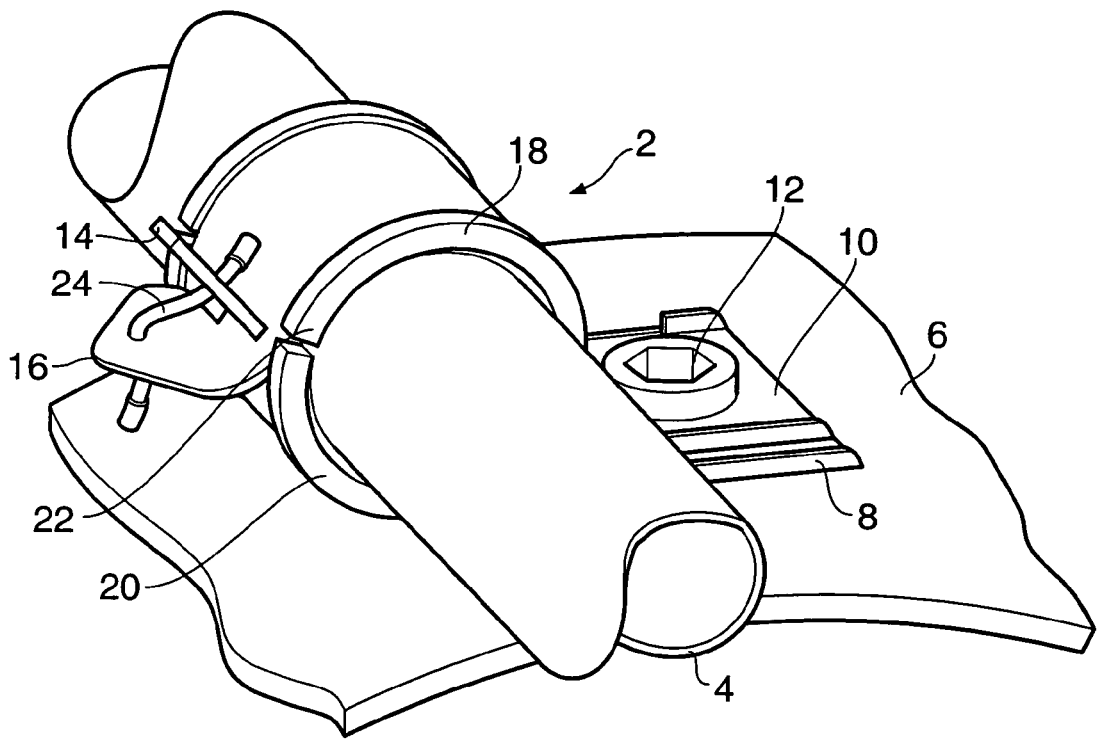

This application claims the benefit of U.S. Provisional Application No. 60/601,126 filed Aug. 13, 2004. The entire disclosure of the prior application is hereby incorporated by reference herein in its entirety.

The present invention relates to clamps for the attachment of cables and pipes to structures. In particular, the present invention relates to clamps such as P-clips, used for the attachment of cables and pipes to gas turbine engines.

Gas turbine engine ancillaries, such as electric cabling and hydraulic pipes are typically run around the external casing of gas turbine engines, attached thereto by clamps, which securely locate about the cable or pipe, and attach to the engine casing, normally via a threaded fitment.

A typically clamp, for example a P-clip, comprises an assembly of at least two parts which are secured to one another around the pipe or cable. Usually, a first part is attached to the engine casing, and the second part is attached to the first part. It is known to design the first part of the P-clip such that the fitment, for example a bolt, is used to both secure the first part to the engine casing and also to clamp the two parts of the clip together. In a particular example, the first part is captive about the bolt, such that the bolt can be partially unscrewed and the first part remains loosely secured to the engine casing. The second part is then placed under the bolt head, and the bolt torqued down to clamp the two parts together, about the pipe or cable.

Where the clamp is located in a confined space, for example the engine bay of an aircraft, it is important that the second part of the clamp is not allowed to fall away from the first part during assembly or disassembly, to avoid foreign object damage. It is known to provide flexible means between the first and second part such that the second part of the P-clip is itself loosely retained to the first part and hence the casing prior to assembly. One such means comprises a hinge between the first and second part. This poses the problem that the second part must move away from the first part in a fixed direction, which may foul other engine ancillaries. Another means comprises a 'lanyard' between the parts. However, such lanyards are prone to jamming between the first and second parts of the clip during assembly, preventing adequate clamping load being applied to the pipe or cable. As such, the lanyards make assembly of the clips more difficult, which is particularly problematic where access is limited, or environmental considerations dictate the use of gloves. Furthermore, such lanyards are prone to flail during engine operation, introducing a resonance source into the ancillaries, and increasing the chances of fretting.

The present invention provides a clamp for securing an element to a structure comprising, a first part and a second part, engageable into an assembled state about the element to be secured, and a flexible element attached to the first part and the second part, which flexible element allows independent movement of the first part and second part when the clamp is not assembled, wherein the clamp further comprises tensioning means adapted to hold the flexible element taught when the clamp is in the assembled state.

Figure 2:
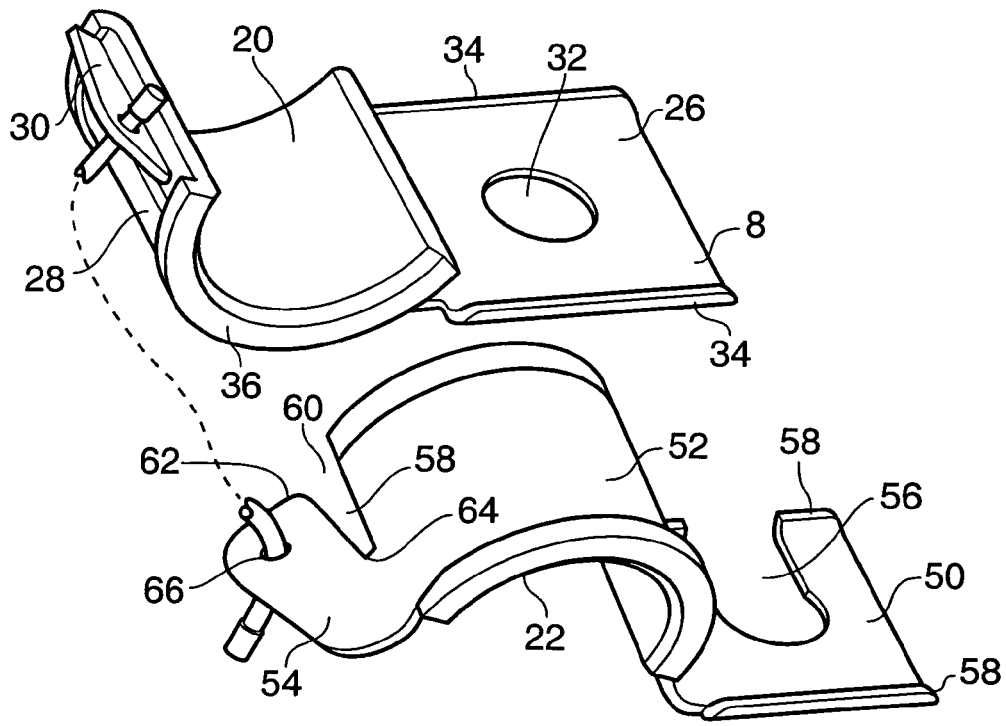
Figure 3A:
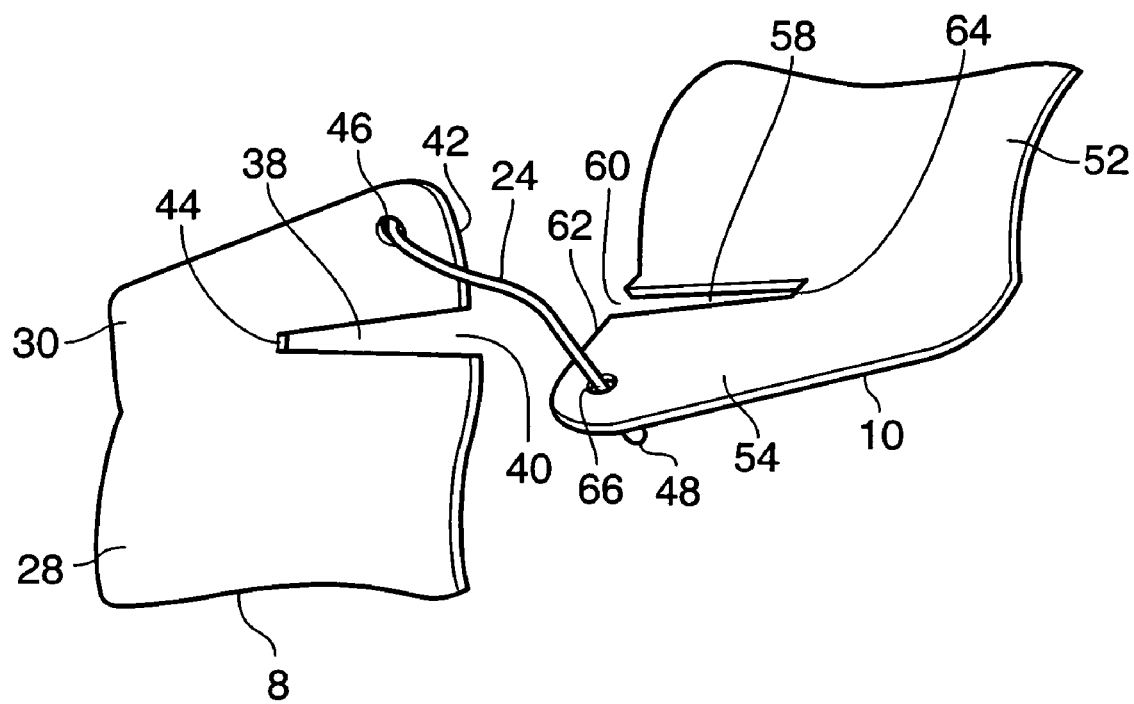
Figure 3B:
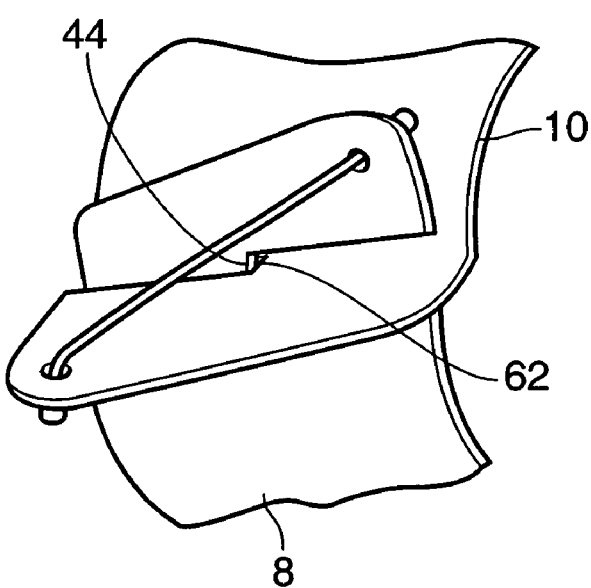
Figure 4:
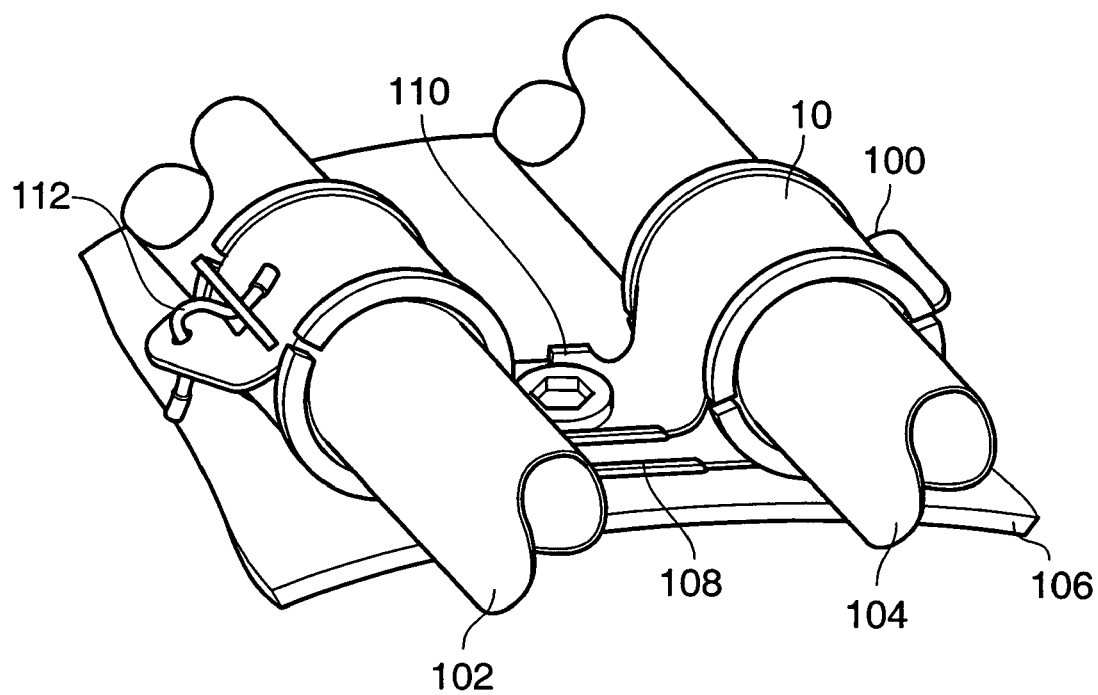
Figure 5:
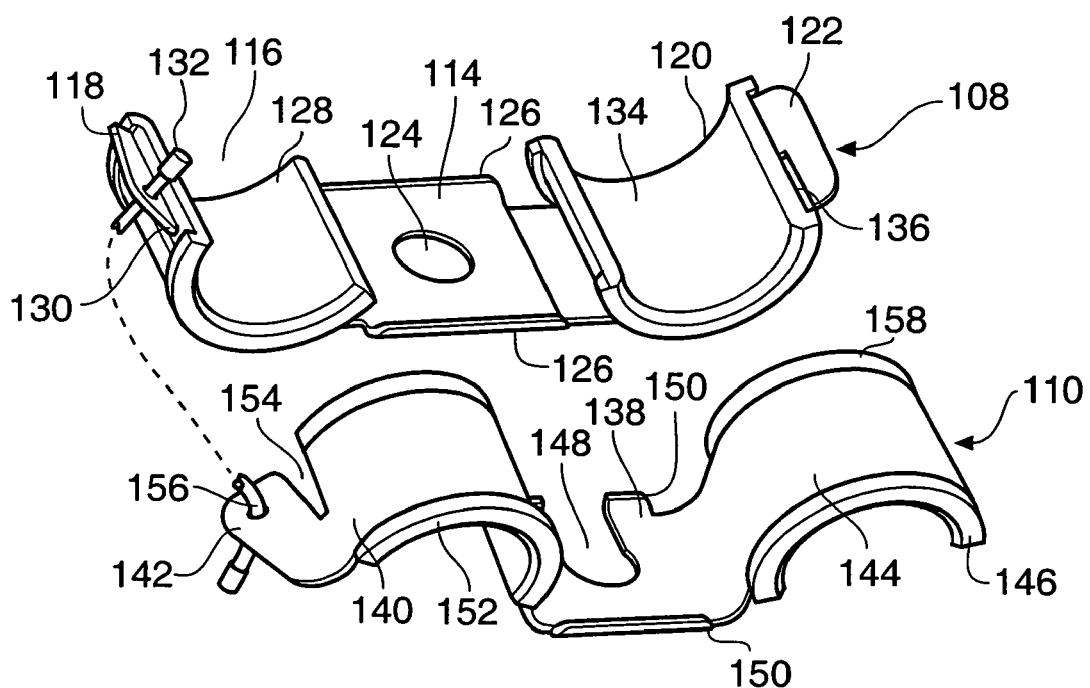

The invention will now be described in more detail with reference to the accompanying drawings in which;

FIG. 1 shows a clamp according to the present invention;
FIG. 2 shows an exploded view of the clamp of FIG. 1;
FIGS. 3a, and 3b show the engaging means of the clamp in more detail;
FIG. 4 shows a further clamp according to the present invention in the assembled and unassembled state, and;
FIG. 5 shows an exploded view of the clamp of FIG. 4.

Turning to FIG. 1, a 'P' clamp 2 secures a titanium fuel pipe 4 to a gas turbine engine casing 6. The clamp 2 is an assembly of a first lower part 8 and a second upper part 10, held together by a bolt 12 that screws into the engine casing 6 and retains the clamp 2 thereto.

The two parts 8,10 are provided with first and second slideably engageable means 14,16; first engageable means 14 provided in the first part of the clamp 2, and second engageable means 16 provided in the second part of the clamp 2. In the assembled state, the first and second engageable means 14,16 are engaged and form a hinge such that the first and second parts 8,10 clamp about the pipe 4 under the load applied by the bolt 12. The clamp 2 engages the pipe 12 via a tubular PTFE bush 18, divided into a first, semi-tubular half-bush 20, bonded to the clamp first part 8, and a second, semi-tubular half-bush 22 bonded to the clamp second part 10. Each half-bush 20,22 covers an arc of about 175°, so that they do not abut when the clamp 2 is in the assembled state, and each has an internal diameter the same as the external diameter of the fuel pipe 4.

The first and second part of the clamp 2 are tethered together by a cable 24, Made from PEEK plastic.

Turning to FIG. 2, an exploded view is shown of the clamp of FIG. 1. The cable 24 is shown divided for clarity, but it will be understood that it is ordinarily attached to the first and second part of the clamp 2.

The first, lower part of the clamp 2 is shaped from a strip of sheet stainless steel to form a flat mounting section 26, a curved bush retaining section 28 and a flap section 30;

The mounting section 26 is flat and square in plan, and defines a central mounting hole 32 through which the bolt 12 passes. The section mounts against the engine casing 6, and is sufficiently flexible to adapt to the curvature of the casing 6. The mounting hole 32 is slightly larger in diameter than the bolt shank, but smaller in diameter than the bolt head, so that the first part of the clamp 2 is captive about the bolt 12 even when only loosely screwed into the engine casing. The edges of the section 26 are raised to form lips 34, which project upwards.

The bush retaining section 28 curves upwards from the mounting section 26 to an angle perpendicular thereto, such that it covers an angle of curvature of about 90°. The section is of a constant radius that matches the external curvature of the first half-bush 20, which is bonded to the section, so its face lies at an angle of about 45°, tipped towards the plane of the mounting section 26. The external surface of the half-bush 20 is provided with flanges 36 which abut either side of the strip.

The flap section 30, which comprises the first engagement means 14, projects from the bush retaining section 28 and is angled upwards, at an angle of about 45° to the plane of the mounting section 26. This section of the clamp 2 will be better understood if reference is made to FIG. 3a, which shows the first and second retaining means of the clamp in more detail, in the unassembled state.

The flap section 30 defines a first engagement slot 38 near its interface with the bush retaining section 28. The slot 38 extends in the width-wise direction of the clamp from the slot entrance 40, located on the anti-clockwise edge 42 of the flap, to the base of the slot 44, located approximately mid span. Both sides of the slot taper inwards from a maximum width at the slot entrance 40 to a minimum width at the base of the slot 44.

The flap section 30 extends normal to this first slot 38 and defines a first retaining hole 46 near its periphery, on the slot entrance side 40 of the flap. The PEEK cable 24 passes through the hole 46, which is greater in diameter than the cable 24, but is smaller in diameter than the ferrules, which cap the cable 24. Hence, the hole 46 forms first retaining means 46 for the PEEK cable.

The second upper part 10 of the clamp 2 is similarly shaped from a strip of sheet stainless steel, to form a flat mounting section 50, a curved bush retaining section 52 and a flap section 54.

The mounting section 50 is flat and square in plan, and defines a mounting slot 56 oriented in the width-wise direction of the strip. The slot is the same width as the diameter of the mounting hole 32 in the first clamp part, and extends from the side of the clamp opposite the first engagement slot 38 to the midspan point. The edges of the section 50 are raised upwards to form lips 58, which lie within and loosely engage the lips 34 of the first part 8 when the clamp parts are engaged. This loose engagement is such that a limited relative rotational movement is permitted between clamp parts 8,10 when the bolt 12 is tightened, but significant movement, which would cause the first and second parts 8,10 to become misaligned, is resisted. The lips 34,58 are of a height such that the second clamp part 10 can be slid into place beneath the bolt head when it is loosened from, but still engaged with the engine casing 6.

The bush retaining section 52 of the second part 10 curves sharply upwards, out of the plane of the mounting section 50 to an angle perpendicular thereto. It then reverses curvature so that the strip bends over the second PTFE half-bush 22, covering an angle of curvature of about 135°. The radius of curvature matches the external curvature of the second half-bush 22, which is bonded to the internal face of the strip so that the face of the second half-bush 22 lies at an angle of about 45°.

The flap section 54, which comprises the second engagement means 16, projects downwards from the bush retaining section 52 angled at about 45° to the mounting section 50. The section 54 defines a second engagement slot 58 near the interface with the bush retaining section. This extends in the width-wise direction from the slot entrance 60, on the clockwise edge of the flap 62, to the base of the slot 64, located approximately mid span. Both sides of the slot 58 taper inwards from a maximum width at the slot entrance 60 to a minimum width at the base of the slot 64. The slot entrance 60 lies on the same side of the clamp 2 as the mounting slot entrance 60.

The flap section 54 extends normal to the second slot 56 and defines a second retaining hole 66 near its periphery, on the slot entrance side. The cable 24 passes through the hole 66, which is greater in diameter than the cable 24, but is smaller in diameter than the ferrules, which cap the cable 24. The hole 66 forms the second retaining means for the cable 24.

Hence, the first and second part 8,10 are captive about the cable 24, but are free to move along its length and are free to rotate about it. This permits a large degree of relative movement between the first and second parts 8,10 when in the unassembled state shown as in FIG. 2 and FIG. 3*a*. This is especially useful when the first part 8 is engaged with the engine casing 6, and the second part 10 must be moved out of the way, but where space does not permit a traditional 'piano hinge' which limits relative movement between parts to a single path which may well conflict with other engine ancillaries, or the surrounding airframe (not shown).

When the clamp 2 is assembled, the first part 8 is placed beneath the pipe 4, so that the first half-bush 18 cups the pipe 4, and the clamp bolt 12 is loosely screwed into the engine casing 6. The second clamp part 10 is then brought into engagement with the first part 8 via the mounting slot 56, which slides beneath the bolt head, and via the first and second engagement slots 38,58. Because all the engagement means i.e. the mounting slot 56 and engagement slots 38,56, comprise slots oriented in the width-wise direction of the clamp, the second part 10 engages the first part 8 along the axis of the pipe 4. This has the advantage that the pipe 4 can be used as a guide for assembly. The PTFE bush 18 permits the second clamp part 10 to slide freely along the pipe 4.

The second part 10 is slid along the pipe 4 until the base of the first slot 44 rests against the base of the second slot 64, as shown in FIG. 3*b*. The tapering geometry of both first and second engagement slot 38,58 ensures that the parts can be engaged easily, but that in the assembled position, there is minimal relative movement therebetween. In this position, the flaps 30,54 extend normal to one another, with the first retaining hole 46 lying adjacent the first, anticlockwise side of the clamp 2, and the second retaining hole 66 lying on the opposite, clockwise side of the clamp 2. The distance between the first and second hole 46,66 in the assembled configuration is chosen such that the cable 24 is held taught by the action of the first and second cable ferrules abutting, respectively, the first and second flaps 30,54. Hence, the retaining means 46,66 provide the tensioning means.

The holes 46,66 are located on opposite sides of the clamp, in overlapping arrangement such that that they are at their closest when the first and second slots 38,58 are first engaged, and become more spaced apart as the two parts 8,10 are urged into the assembled state, when the base of the first and second slot 44,64 abut one another. This permits sufficient cable 24 to be held taught in the assembled state to allow a useful amount of free movement in the unassembled state.

When the mounting bolt 12 is tightened, the second clamp part 10, located directly beneath the bolt head, is rotated clockwise the small amount permitted, relative to the first clamp part. Because the first hole 46 is located on the anticlockwise side 42 of the first clamp part 8, and the and second hole 66 is located on the clockwise face 62 of the second part 10, any relative displacement between first and second clamp parts 8,10, during tightening of the bolt, will increase the tension applied to the cable. This ensures that the cable 24 does not loosen as the bolt 12 is tightened.

The geometry of the first and second clamp parts 8,10 is such that, in the assembled state about the fuel pipe 4, before the mounting bolt 12 is fully tightened against the engine casing 6, there is a gap between the first and second mounting sections 26,50. Hence as the bolt 12 is tightened, the first and second clamp parts 8,10 elastically deform, which applies a spring load to the under surface of the bolt 12, and thereby acts as a spring washer. Furthermore, the small amount of elastic deformation allows the clamp 2 to better accommodate small variations in dimensions that may be introduced through manufacture and assembly. In the present example, this gap is about 10 mm.

FIG. 4 shows a second clamp 100 according to the present invention. The clamp 100 is suitable for clamping a first and second pipe 102,104 to an engine casing 106. As with the previous clamp of FIGS. 1 through 3, the clamp 100 is an assembly of a first lower part 108 and a second upper part 110, held together by a bolt 111 that screws into the engine casing 106 and retains the clamp 100 thereto. The first and second parts 108,110 are tethered by a cable 112, made from PEEK plastic.

Turning to FIG. 5, which shows an exploded view of the second clamp 100, the first part 108 of the second clamp 100 is shaped from a strip of sheet stainless steel to form a mounting section 114, a first bush retaining section 116, a first flap section 118, a second bush retaining section 120, and a second flap section 122.

The mounting section 114 lies at the centre of the part 108, and defines a central mounting hole 124, which performs the same function as the mounting hole of the first clamp. The section is square in plan and flat, with sufficient flexibility that it can accommodate the curvature of the engine casing 108. The first and second bush retaining sections 116,120 curve upwards from opposite sides of the mounting section 114 to give the first clamp part 108 a trough profile. The remaining edges are raised to form lips 126.

The first bush retaining section 116 curves, with constant radius, upwards from the mounting section 114, such that it covers an angle of curvature of about 90°. A first, semi-tubular half bush 128 is bonded to the inside of this section, tilted up from the mounting section 114 at an angle of about 45°.

The first flap 118 projects from the end of the first retaining section 116 at a 45° angle to the mounting section 114. The flap section 118 defines a first engagement slot 130 near its interface with the bush retaining section 116, which is tapered. The slot 130 extends in the width-wise direction of the clamp from an entrance on the anti-clockwise side to the base of the slot located about mid-span. The flap 118 extends normal to this first slot 130 and defines a first retaining hole 132 near its periphery, on the slot entrance side of the flap 118, through which the first end of the cable 112 passes.

The second bush retaining section 120 is, essentially, a mirror image of the first. It also curves, with constant radius, upwards from the mounting section 114, such that it covers an angle of curvature of about 90°. A second, semi-tubular half bush 134 is bonded to the inside of the section 120, tilted up from the mounting section at an angle of about 45°. The second flap 122 projects from the second retaining section 120 at the same angle. The second flap defines a second engagement slot 136 which extends in the width-wise direction of the flap from an entrance on the same side of the clamp 100 as the first slot 130, to the base of the slot 136, located about mid-span. The second flap 136 does not have a retaining feature.

The second clamp part 110 is shaped from a strip of sheet stainless steel to form a mounting section 138, a third bush retaining section 140, a third flap section 142, a fourth bush retaining section 144, and a fourth flap section 146.

The mounting section 138 is square in plan and flat, and defines a mounting slot 148 which extends in the width-wise direction of the clamp 100 from the centre of the section to the side of the clamp opposite the first and second engagement slot entrances 130,136. The third and fourth bush retaining sections 140,144 curve upward from opposite sides of the mounting section 138. The remaining edges are raised to form lips 150.

The third bush retaining section 140 of the second part 110 curves sharply upwards, out of the plane of the mounting section 138 to an angle perpendicular thereto. It then reverses curvature, covering an angle of curvature of about 135°, so that the strip bends up and over a third PTFE half-bush 152. The radius of curvature is such that the internal face of the section 140 matches the external curvature of the half-bush 152, which is bonded to the internal face at an angle of about 45°.

The third flap 142 projects downwards from the end of the third retaining section 140 at an angle of about 45° to the mounting section 138. The section defines a third engagement slot 154 near its interface with the retaining section 140, which is tapered. The slot extends in the width-wise direction of the flap 142 from the slot entrance, on the clockwise side of the part, to the base of the slot, located about mid-span. The section 142 extends normal to this first slot 154 and defines a first retaining hole 156 near its periphery, on the slot entrance side of the flap 154, through which the second end of the cable 112 passes.

The fourth bush retaining section 144 is a mirror image of the third. It curves sharply upwards, out of the plane of the mounting section 138 to an angle perpendicular thereto, and then reverses curvature, covering an angle of curvature of about 135°, so that the strip bends up and over a fourth PTFE half-bush 158. The radius of curvature is such that the internal face of the section matches the external curvature of the half-bush 158, which is bonded to the internal face at an angle of about 45°.

The fourth flap 146 projects downwards from the end of the fourth retaining section 144 at an angle of about 45° to the mounting section 138. The section defines a fourth tapered engagement slot (not visible) near its interface with the retaining section 144 which extends in the width-wise direction of the flap from an entrance, on the same side as the third slot entrance, to the base of the slot which is located about mid-span. This fourth flap 146 does not have a retaining feature.

The first and third slotted flaps 118,142 provide slideable engagement means, and provide retaining means for the cable 112 and tension it in the assembled state. The second and fourth slotted flaps 122,146 provide slideable engagement means at the opposite end of the clamp 100.

During assembly, the first clamp part 108 is placed beneath the pipes 102,104 such that the first half-bush 128 cups the first pipe 102, and the second half-bush cups the second pipe 104. The bolt 111 is then loosely screwed into the engine casing 106 to hold the first clamp part captive.

The second part 110 is then brought into engagement with the first part 108. The first slotted flap 118 is engaged with the third slotted flap 142, and the second slotted flap 122 with the fourth slotted flap 146. At the same time, the mounting slot 148 is engaged with the underside of the bolt head 111. The second clamp is then slid along the pipes until the respective slots abut one another. The bolt 111 is then tightened.

It will be understood that the above embodiments are intended to exemplify the invention and not to limit its scope.

For example, the tensioning means, which tension the cable when the clamp is in the assembled state, may alternatively comprise the selection of a cable which is sufficiently stiff that, in the assembled state, the angular relationship of the first and second holes, which lie substantially normal one another, and the displacement between holes, prevents the cable from bending sufficiently to foul the first and second slots during engagement.

The present invention is equally well suited to the mounting of other engine ancillaries, such as wiring looms and hydraulic lines. In such cases, it may be desirable to change the PTFE bushes of the embodiment described to bushes made from other materials, such as rubber or nylon.

Pipes of different diameters may be mounted using the second clamp 100, by choosing suitable dimensions for the bush retaining parts, and attendant bushes.

Flexible elements may be used to tether the first and second clamp parts together other than cables. For example, nylon rope can be used.

Although tapered slots are preferred, conventional, constant width slots could be used instead.

The invention claimed is:

1. A clamp for securing an element to a structure, the clamp comprising:
   two inter-engageable parts, each of a first part and a second part includes a mounting section, for attachment to the structure, and a retaining section for accepting the element to be secured, the first part further including a first slotted flap, the second part further including a second slotted flap, the first slotted flap and the second slotted flap being slideably engageable with one another to provide engagement means for assembly of the clamp about the element to be secured;

a flexible element attached to the first part and to the second part, the flexible element allowing independent movement of the first part and second part when the clamp is not assembled; and tensioning means adapted to hold the flexible element taut when the clamp is in an assembled state, wherein the tensioning means comprises a first flexible element retaining means attached to the first part, and a second flexible element retaining means attached to the second part, the first and second flexible element retaining means disposed to lie apart when the clip is assembled such that the flexible element is held taut, and the first flap forms the first flexible element retaining means, and the second flap forms the second flexible element retaining means.

2. The clamp as claimed in claim 1, wherein the first flexible element retaining means and the second flexible element retaining means are arranged to overlap one another as the clip is assembled, such that during assembly, reduction of the distance between the first and second flexible element retaining means occurs during assembly, and tension is applied in the assembled state.

3. A clamp for securing an element to a structure, the clamp comprising:

two inter-engageable parts, each of a first part and a second part includes a mounting section, for attachment to the structure, and a retaining section for accepting the element to be secured, the first part further including a first slotted flap, the second part further including a second slotted flap, the first slotted flap and the second slotted flap being slideably engageable with one another to provide engagement means for assembly of the clamp about the element to be secured;

a flexible element attached to the first part and to the second part, the flexible element allowing independent movement of the first part and second part when the clamp is not assembled; and tensioning means adapted to hold the flexible element taut when the clamp is in an assembled state, wherein a bolt is used to clamp the first part and the second part together and to attach the clamp to the structure, wherein an action of the bolt upon the first part and the second part causes limited relative movement, the relative movement causing the flexible element to be tensioned.

\* \* \* \* \*